United States Patent
Desforges

(10) Patent No.: US 9,644,936 B2
(45) Date of Patent: May 9, 2017

(54) MEASUREMENT METHOD WITH IMPROVED PRECISION IN MEASUREMENT POINT CAPTURE

(71) Applicant: HEXAGON METROLOGY SAS, Courtaboeuf (FR)

(72) Inventor: Laurent Desforges, Ambloy (FR)

(73) Assignee: HEXAGON METROLOGY SAS, Courtaboeuf (FR)

( * ) Notice: Subject to any disclaimer, the term of this patent is extended or adjusted under 35 U.S.C. 154(b) by 187 days.

(21) Appl. No.: 14/516,068

(22) Filed: Oct. 16, 2014

(65) Prior Publication Data

US 2015/0107125 A1    Apr. 23, 2015

(30) Foreign Application Priority Data

Oct. 18, 2013  (FR) ...................................... 13 60204

(51) Int. Cl.
| | | |
|---|---|---|
| *G01B 7/008* | (2006.01) | |
| *G01B 5/008* | (2006.01) | |
| *G01B 21/04* | (2006.01) | |

(52) U.S. Cl.
CPC ............. *G01B 7/008* (2013.01); *G01B 5/008* (2013.01); *G01B 21/047* (2013.01); *G01B 2210/00* (2013.01)

(58) Field of Classification Search
CPC ................................ G01B 7/008; G01B 5/008
USPC ................................ 33/503, 1 CC, 702, 502
See application file for complete search history.

(56) References Cited

U.S. PATENT DOCUMENTS

| | | | | |
|---|---|---|---|---|
| 4,676,002 A | * | 6/1987 | Slocum | .................... B25J 9/046 33/1 MP |
| 5,724,264 A | * | 3/1998 | Rosenberg | ............. G01B 5/008 700/161 |
| 6,668,466 B1 | | 12/2003 | Bieg et al. | ....................... 33/503 |
| 6,817,108 B2 | * | 11/2004 | Eaton | ................... G01B 21/047 33/503 |
| 6,931,745 B2 | * | 8/2005 | Granger | ................. H01R 35/04 33/1 PT |

(Continued)

FOREIGN PATENT DOCUMENTS

WO    WO 2009/130169 A1    10/2009

OTHER PUBLICATIONS

Shimojima et al., The Estimation Method of Uncertianty of Articulated Coordinate Measuring Machine, IEEE ICIT, Dec. 11-14, 2002, pp. 411-415.

(Continued)

*Primary Examiner* — Christopher Fulton
(74) *Attorney, Agent, or Firm* — Sunstein Kann Murphy & Timbers LLP

(57) ABSTRACT

Method for measuring a part using an articulated measurement arm having a measurement head provided with a pointing member and at least one joint fitted with at least one rotary encoder, comprising focusing on a first measurement point on the part, the measurement arm adopting a first measurement position, moving the measurement arm to a second measurement position to focus on a second measurement point of the part in order to capture a geometric feature of the part on the basis of the measurement points, and determining a degree of precision of the capture of the geometric feature undertaken as a function of the first and second positions of the measurement arm.

12 Claims, 6 Drawing Sheets

(56) References Cited

U.S. PATENT DOCUMENTS

| | | | | |
|---|---|---|---|---|
| 6,996,912 B2* | 2/2006 | Raab | ...................... | B25J 18/002 |
| | | | | 33/1 PT |
| 7,051,447 B2* | 5/2006 | Kikuchi | ................. | G01B 21/04 |
| | | | | 33/366.11 |
| 7,693,325 B2* | 4/2010 | Pulla | ...................... | G01B 21/04 |
| | | | | 33/503 |
| 7,743,524 B2* | 6/2010 | Eaton | ................... | G01B 21/047 |
| | | | | 33/1 PT |
| 7,779,548 B2* | 8/2010 | Ferrari | ................. | G01B 21/047 |
| | | | | 33/503 |
| 7,784,194 B2* | 8/2010 | Raab | ...................... | G01B 5/008 |
| | | | | 33/503 |
| 7,805,851 B2* | 10/2010 | Pettersson | .............. | G01B 5/008 |
| | | | | 33/503 |
| 8,082,673 B2* | 12/2011 | Desforges | .............. | B25J 9/1692 |
| | | | | 33/503 |
| 8,122,610 B2* | 2/2012 | Tait | ...................... | G01B 21/042 |
| | | | | 33/502 |
| 2011/0046917 A1 | 2/2011 | Lippuner et al. | ............. | 702/150 |

OTHER PUBLICATIONS

National Institute of Industrial Property, Preliminary Research Report—French Application No. 1360204, together with the Written Opinion, dated Apr. 10, 2014, 4 pages.

\* cited by examiner

MEASUREMENT METHOD WITH IMPROVED PRECISION IN MEASUREMENT POINT CAPTURE

PRIORITY

This patent application claims priority from French patent application number FR 13 60204, filed Oct. 18, 2013, entitled, "Measurement method with improved precision in measurement point capture," and naming Laurent Desforges as inventors, the disclosure of which is incorporated herein, in its entirety, by reference.

FIELD OF THE INVENTION

The invention generally relates to coordinate metrology and, more particularly, the invention relates to three-dimensional measurement arms.

BACKGROUND OF THE INVENTION

A three-dimensional measurement machine is a measurement instrument used in dimensional metrology that is designed to capture the coordinates of different points of a part to be measured in order for example to check conformity of the dimensions, geometry and/or shapes of the part.

Such machines generally include a base on which is mounted a measurement arm, at the end of which there is a measurement head. The measurement arm conventionally comprises rigid segments linked together for example using pivots and/or ball joints provided with encoders precisely measuring the movements of the segments in relation to one another. The measurement head has means for capturing a point on an object to be measured.

There are two main types of measurement head that are distinguished by whether the measurement is taken with or without contact with the part. With contact measurement heads, the measurement head has a probe that comes into contact with the part. The capturing of coordinates is commanded either automatically by detection of the contact between the probe and the surface of the part, or by the operator using a command button that the operator actuates when the probe is in contact with the desired zone of the part. With contactless measurement heads, the measurement head incorporates an optical sensor (scanner) generally comprising a laser diode pointer that illuminates a small zone of the surface of the part to be measured and a camera that captures the reflected light, obtaining the distance measurement thereof by calculating the delay between the light signal emitted and the light signal reflected by the surface of the part to be measured. The capture command may be given continuously or as required by the operator using a command button that the operator actuates when the sensor is in contact with the desired zone of the part.

When the capture command is given, the relative positions of the different segments of the measurement arm are saved in the memory of a processing unit linked to the measurement arm. The processing unit is set up to determine the coordinates of the measurement points in a reference system, generally attached to the base, on the basis of the dimensions of the segments, the relative positions thereof and measurement-head information. Correctly processing these coordinates enables the dimensions, shape and geometry of the part to be measured to be obtained.

The angular encoders attached to the ends of the rigid segments are for example point encoders. These encoders generally have a circular plate marked with several equidistant points all located on a single circle. During one rotation, a sensor (which may be magnetic or optical, depending on the nature of the points) counts the number of points that pass before the counting cell thereof, calculating therefrom the amplitude of the rotation effected. A measurement arm generally has four angular encoders:

a first encoder measures the rotation about a vertical axis of the first rigid segment of the measurement arm in relation to the rigid base;

a second encoder measures the rotation about a horizontal axis of the first rigid segment of the measurement arm in relation to the rigid base;

a third encoder measures the rotation about a horizontal axis of a second rigid segment of the measurement arm in relation to the first rigid segment of the measurement arm with which it is articulated;

a fourth encoder measures the rotation about a horizontal axis of the measurement head in relation to the second rigid segment of the measurement arm on which it is mounted.

There are numerous factors liable to affect the precision of a measurement, including:

axial and radial play in the axes of the bearings of the arm joints;

bending of the segments, which do not provide absolute rigidity;

the resolution of each encoder.

The error generated by these different factors can increase with the amplitude of the movements of the different elements of the measurement arm. In general, the greater the variation in the position of each of the elements making up the arm (segments, joints, encoders, etc.), the greater the negative effect of the measurement error.

Thus, when moving from one measurement point to another, imprecisions from all sources are accumulated, resulting in an overall imprecision in the determination of the coordinates of the measurement points and therefore of the geometric feature it is intended to measure, such as the difference between measurement points.

SUMMARY OF VARIOUS EMBODIMENTS

In accordance with one embodiment of the invention, the precision related to capturing coordinates of measurement points using a measurement arm may be increased.

In some embodiments, a method is provided for measuring a part using an articulated measurement arm having a measurement head provided with a pointing member and at least one rotary encoder, comprising:

focusing on a first measurement point on the part, the measurement arm adopting a first measurement position;

moving the measurement arm to a second measurement position to focus on a second measurement point of the part in order to capture a geometric feature of the part on the basis of the measurement points;

determining a degree of precision of the capture undertaken as a function of the first and second positions of the measurement arm.

Thus, the operator of the measurement arm has information relating to the precision of the measurement that they have just taken, enabling them to adapt how they move the measurement arm with a view to reducing this imprecision.

According to one advantageous embodiment, the measurement method according to the invention includes the additional step of sending an indicator relating to the degree of precision determined to an operator in charge of moving the articulated measurement arm.

The operator can then determine whether or not it is necessary to retake the measurement while modifying the second measurement position of the arm in order to obtain a degree of precision of the capture that is greater than a predetermined threshold.

According to another embodiment, the method according to the invention includes the additional step of determining a second measurement position of the articulated measurement arm resulting in a degree of precision of the capture that is greater than a predetermined threshold.

Once this movement has been determined and sent to the operator, they have the information available to enable the measurement to be retaken while moving the measurement arm to adopt the position determined and to achieve the desired degree of precision.

The invention also relates to an articulated measurement arm having a measurement head and at least one rotary encoder both linked to a processing unit, the processing unit being set up to implement the method set out above.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
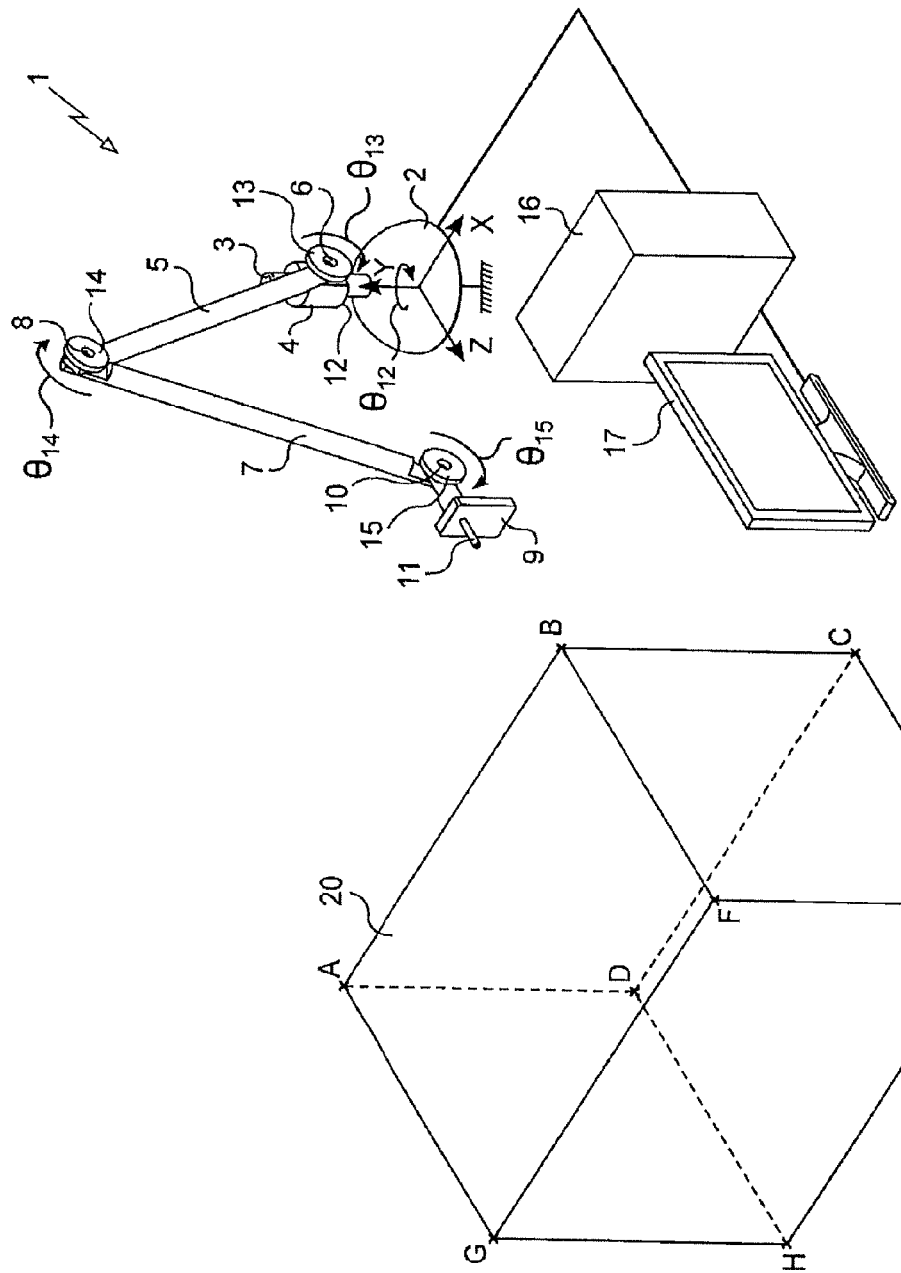
FIG. 1 schematically shows a perspective view of a measurement arm implementing a first embodiment of the method according to the invention.

With reference to FIG. 1, the articulated arm according to the invention, generally indicated 1, includes a fixed base 2 attached to a supporting element such as a table or the ground and bearing a vertical shaft 3 on which a bearing 4 is mounted rotatably. A first end of a first arm segment 5 is articulated with the bearing 4 by means of a horizontal-axis pivot link 6. The second end of the first arm segment 5 receives a second arm segment 7 articulated at one of the ends thereof about a horizontal-axis pivot 8. The other end of the second segment 7 of the measurement arm 1 receives a pointer head 9 (in this case a head with a probe 11) which is also articulated about a horizontal-axis pivot 10. In this case, the measurement arm 1 is a manual arm in as much as it is moved by an operator moving the pointer head 9 and none of the joints thereof are motorized. The vertical shaft 3 and each arm segment 5 and 7 have respectively a rigidity K3, K5 and K7 established when the measurement arm is designed and validated using measurements taken during manufacture of the measurement arm 1.

The bearing 4 and the pivots 6, 8 and 10 are respectively provided with an absolute optical rotary encoder 12, 13, 14 and 15 measuring respectively the angles of rotation $\theta_{12}$, $\theta_{13}$, $\theta_{14}$, $\theta_{15}$ of each of the joints of the measurement arm 1. These encoders are linked to a processing unit 16, which is in turn linked to display means, in this case a screen 17. The processing unit 16 receives the values $\theta_{12}$, $\theta_{13}$, $\theta_{14}$, $\theta_{15}$ and, on the basis of the dimensions of the measurement arm segments 5 and 7, of the vertical shaft 3 and of the distance separating the end of the probe 11 from the end of the arm segment 7, determines the coordinates of the measurement point being captured in an orthogonal coordinate system Oxyz connected to the fixed base 2. Using the coordinates of several points, the processing unit 16 calculates the distances separating the measurement points and/or the geometry of the measured part. The bearing 4 and the pivots 6, 8 and 10 have at least one axis of articulation in which the respective axial and radial play Jax6/Jrad6, Jax8/Jrad8, Jax10/Jrad10 is determined and calibrated during manufacture.

Figure 2:
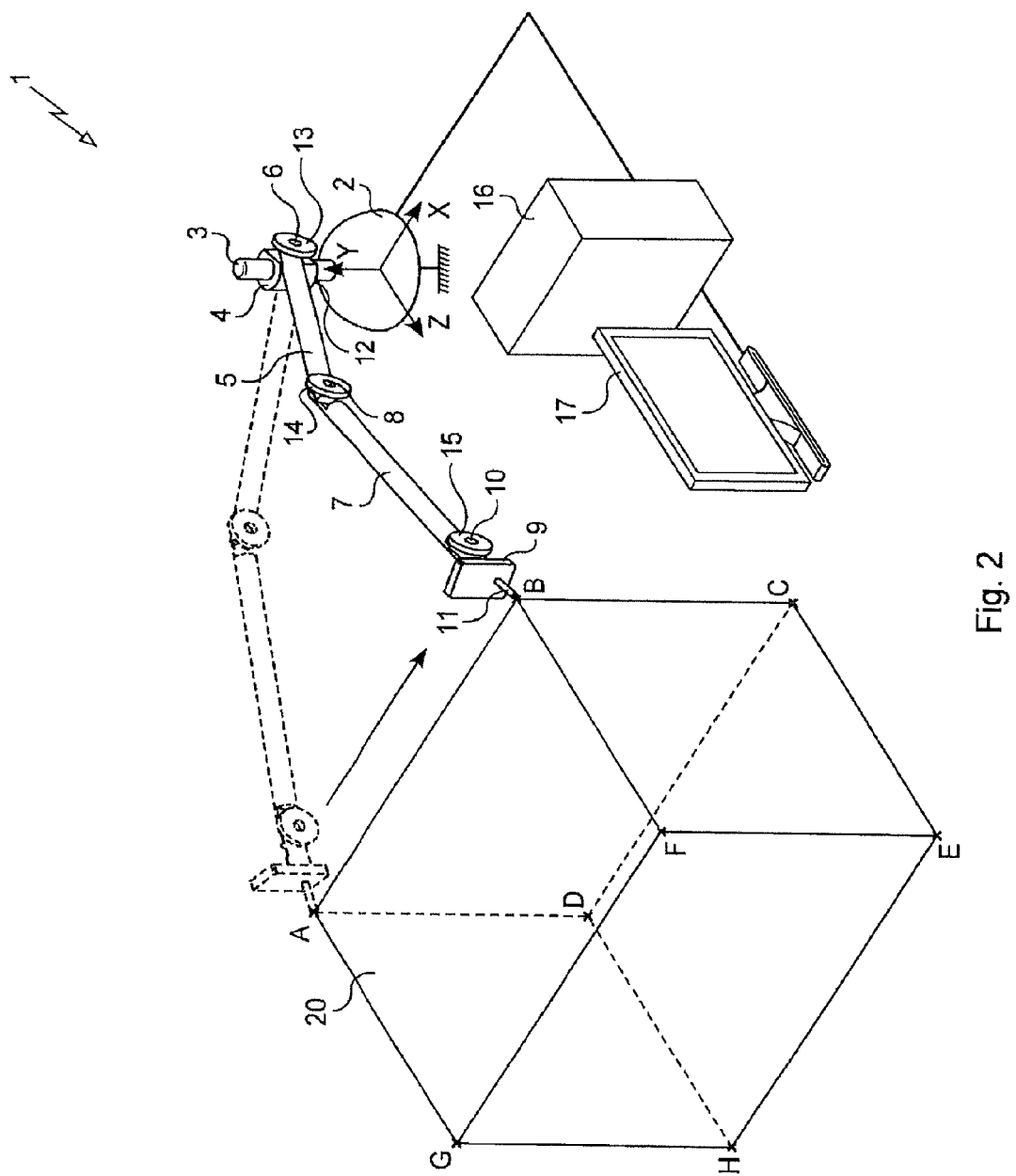
FIG. 2 schematically shows a perspective view of a measurement arm during a step of the first embodiment of the method according to the invention following the step in FIG. 1.
Figure 3:
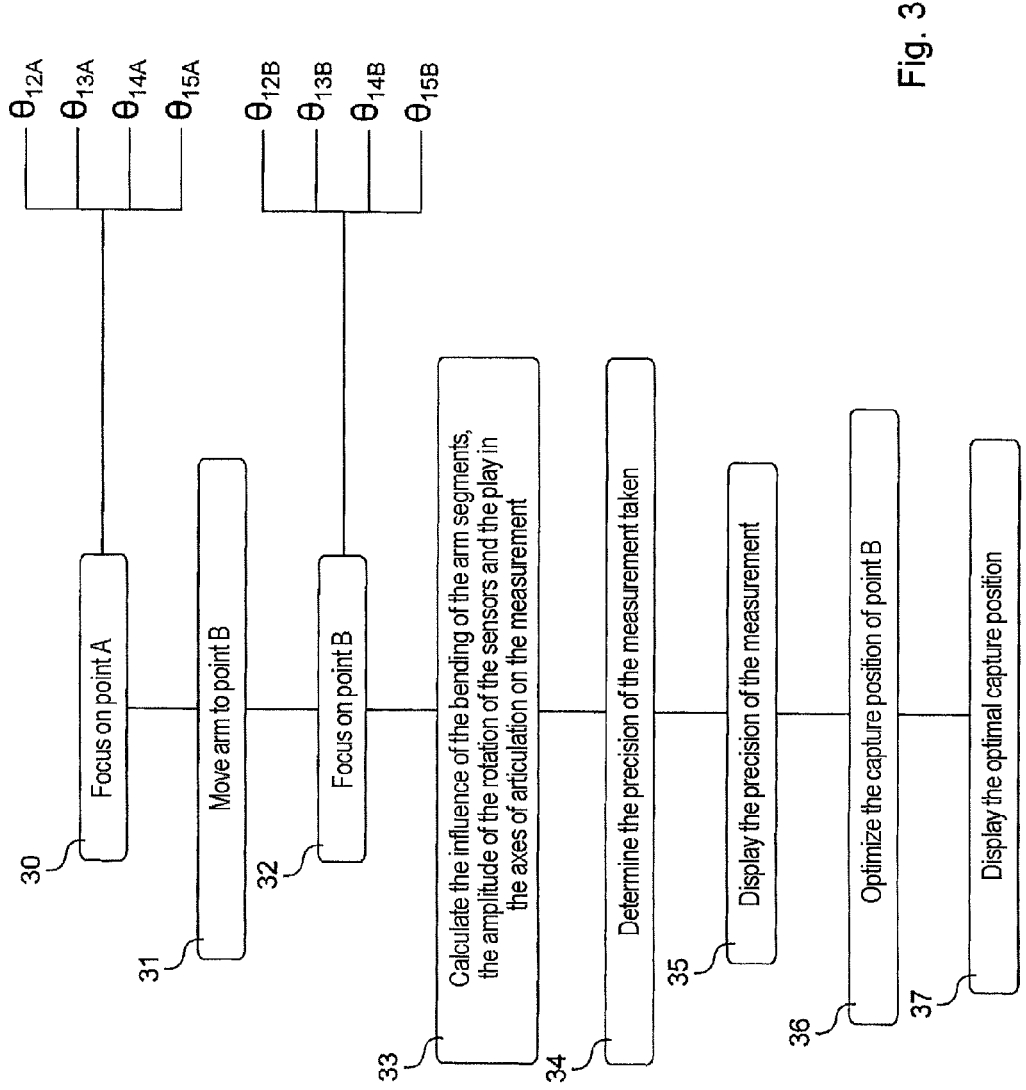
FIG. 3 shows a process of the first embodiment of the method according to the invention.

With reference to FIGS. 1 to 3, the method according to the invention is described in an application in which the measurement arm 1 is used to perform a dimensional check of a parallelepipedic part 20 by capturing the coordinates of the eight vertices thereof A, B, C, D, E, F, G, H. According to the first step 30 of the measurement method according to the invention, the operator moves the measurement arm 1 to bring the end of the probe 11 into contact with the vertex A. The measurement arm is then in a first measurement position of the position of point A shown using a broken line in FIG. 2. The capture of this position is validated by actuating a command button mounted on the pointer head 9. The values $\theta_{12A}$, $\theta_{13A}$, $\theta_{14A}$, $\theta_{15A}$ of the encoders attached to the joints of the measurement arm 1 during capture of the position of point A are then saved by the processing unit 16. The operator then moves the measurement arm 1 to a second measurement position to focus a second point B of the part 20 (step 31). This second measurement position of the measurement arm 1 is shown using an unbroken line in FIG. 2. During this movement, the operator modifies the relative positions of the shaft 3 and of the segments 5, 7 and 9 of the measurement arm 1, which correspond to the values $\theta_{12B}$, $\theta_{13B}$, $\theta_{14B}$, $\theta_{15B}$ of the encoders attached to the joints of the measurement arm 1. These values are saved by the processing unit 16 during validation of the focusing of the position of point B (step 32). During step 33, the processing unit 16 calculates the geometry of the shaft 3 and of the segments 5 and 7 caused by the bending thereof as a function of their respective rigidity K3, K5 and K7 for each measurement position of the arm 1. The processing unit 16 also calculates the effects of the axial and radial play Jax6/Jrad6, Jax8/Jrad8, Jax10/Jrad10 of the joints 6, 8 and 10, as well as the influence of the amplitude of the rotation of the encoders 12 to 15 on the position of the measurement arm for each of the measurement positions.

This calculation is performed using a finite element model 17 of each element making up the measurement arm 1, including the shaft 3, the segments 5 and 7, the joints 6, 8, 10 and the encoders 15 to 12. The processing unit 16 simulates the first measurement position and the second measurement position of the measurement arm 1 using the values $\theta_{12A}$, $\theta_{13A}$, $\theta_{14A}$, $\theta_{15A}$ and $\theta_{12B}$, $\theta_{13B}$, $\theta_{14B}$, $\theta_{15B}$ of the encoders and compares the distance measurement AB obtained with the distance measurement that would be obtained from a perfect theoretical model of the measurement arm 1 (i.e. one with no play that is made up of infinitely rigid elements and in which the resolution of the encoders is constant). The processing unit 16 then calculates a degree of precision of the measurement of the distance AB corresponding to the difference between the perfect model and the simulated model (step 34). The processing unit 16 then sends a display instruction to the screen 17 (step 35) of an indicator relating to the degree of precision of the measurement taken. This indicator may be a numeric value (percentage) of the degree of precision related to the measurements along each of the axes Ox, Oy, Oz of the orthogonal coordinate system Oxyz or of the degree of precision of the distance measured. Alternatively, a qualitative indicator in the form of a coloured signal (for example green or red) or a validation beep enables the operator to determine whether the degree of precision of the measurement taken is within a range compliant with the specific requirements previously specified in the processing unit. According to a specific embodiment corresponding to the additional steps 36 and 37, the processing unit 16 analyses the positions of the points A and B captured and determines a second measurement position of the measurement arm 1 corresponding to the capture of point B that results in a degree of precision that exceeds a predetermined threshold, or even a maximum degree of precision. This position is determined by the processing unit 16 using iterations in the simulation 17 resulting in the determination of a second measurement position of the measurement arm 1 for which the degree of precision of the capture of the distance AB is optimal or greater than a predetermined level.

Figure 4:
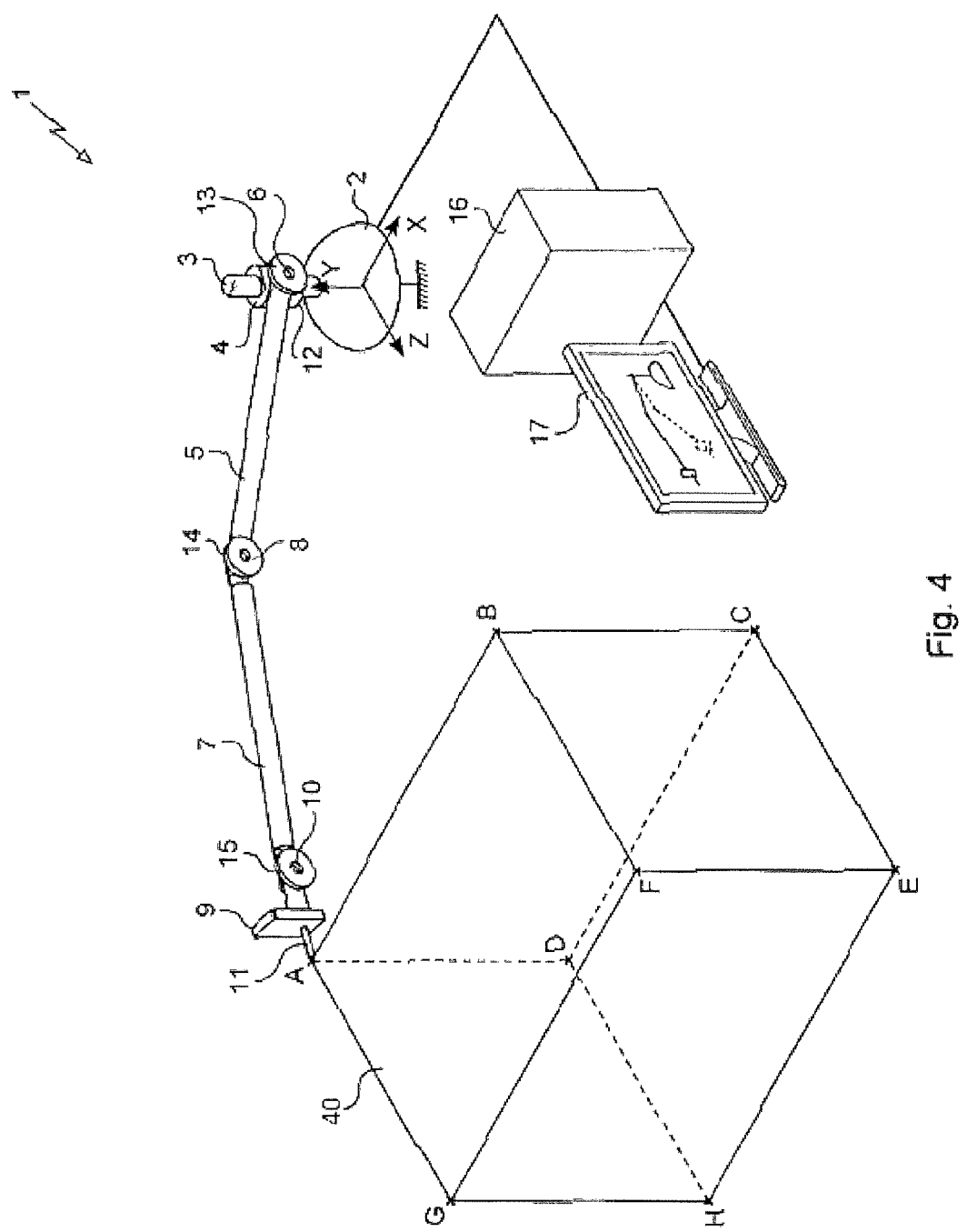
FIG. 4 schematically shows a perspective view of a measurement arm implementing a second embodiment of the method according to the invention.
Figure 5:
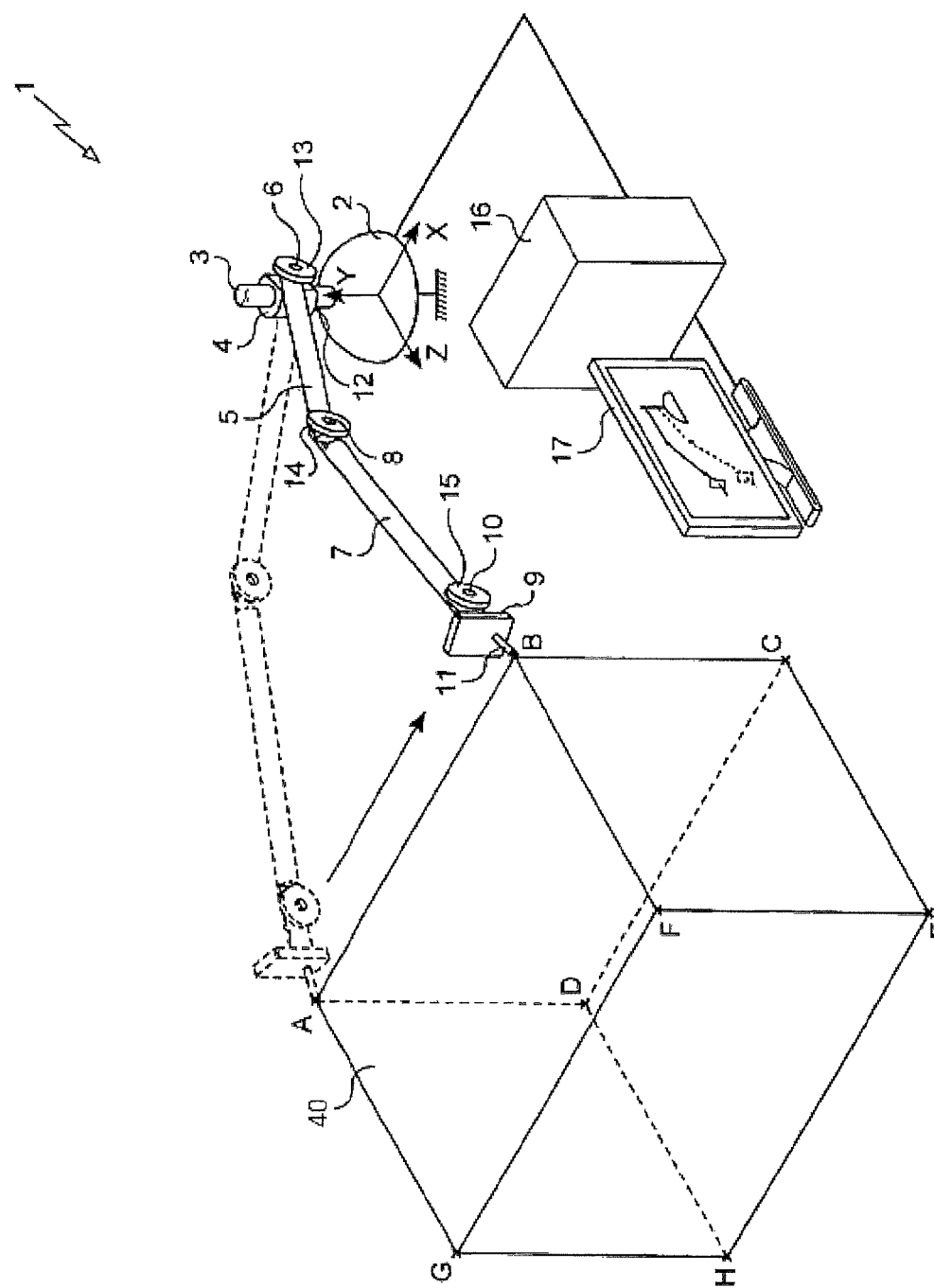
FIG. 5 schematically shows a perspective view of a measurement arm during a step of the second embodiment of the method according to the invention following the step in FIG. 4.
Figure 6:
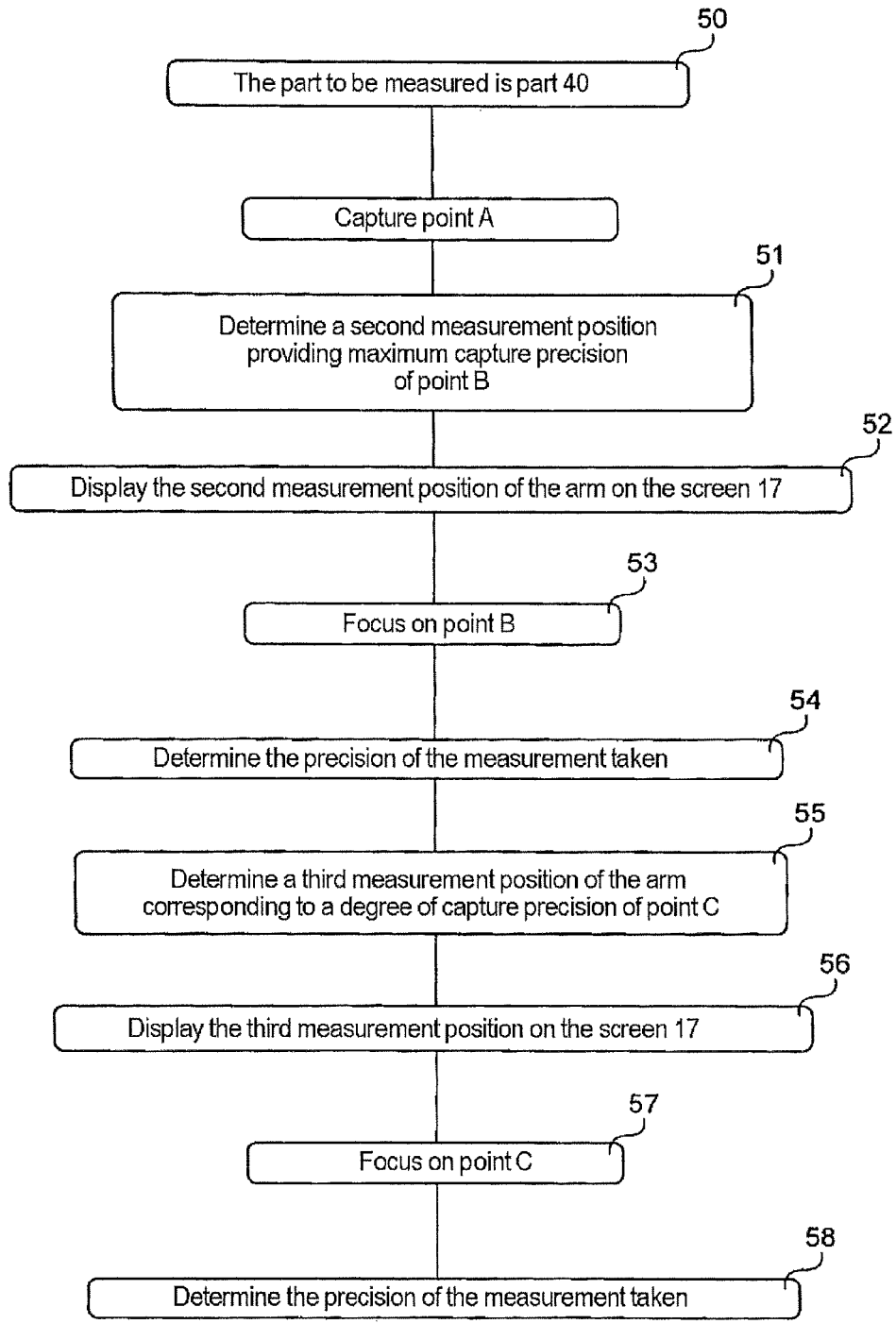
FIG. 6 shows a process of the second embodiment of the method according to the invention.

According to another embodiment and with reference to FIGS. 4 to 6, the measurement arm 1 is used to perform the dimensional check of a parallelepipedic part 40 by capturing the coordinates of the eight vertices thereof A, B, C, D, E, F, G, H. In this embodiment, the theoretical positions of the points A to H are known. This embodiment corresponds for example to a dimensional check of a production part 40. Prior to the dimensional check of the part 40, the operator informs the processing unit 16 that they are about to start checking the known part 40 (step 50). Once the position of the first point A has been captured, the processing unit 16 then determines the path of the measurement arm 1 from the current position of the measurement arm 1 to the second measurement point to be captured (in this case point B) providing maximum capture precision (step 51). The processing unit 16 then sends the movement instructions to the display 17 for the attention of the operator (step 52). In this case, these instructions are a three-dimensional representation of the measurement arm 1 in the second measurement position determined by the processing unit 16. The screen 17 also shows a three-dimensional representation of the measurement arm 1 in the current position thereof. The operator then needs to bring these two representations together. This situation is shown in FIG. 4.

Once the operator has focused point B (step 53), the processing unit 16 then determines the position of the measurement arm 1 from the current position thereof (point B) to a third measurement point (in this case point C) providing minimum measurement imprecision (step 54) and then displays on the screen 17 a three-dimensional representation (step 55) of this position. This situation is shown in FIG. 6. The operations to capture the position of the other points D to H are performed by repeating steps 53 to 55 as many times as necessary.

This constitutes a method for improving the capture of a measurement point in which the degree of precision relating to the capture of the coordinates of the measurement point by an articulated measurement arm is increased.

Naturally, the invention is not limited to the embodiments described, but covers all variants falling within the scope of the invention, as defined by the claims.

In particular:

although in this case the measurement arm rests on a fixed base, the invention applies equally to a measurement arm linked to a movable base;

although in this case the measurement arm has a probe measurement head, the invention applies to other types of measurement head such as optical-sensor measurement heads;

although in this case the movement instructions of the arm correspond to a three-dimensional representation of the position of the end of the probe, the invention applies equally to other types of representation, such as successive basic movements of each of the elements of the arm along three axes or basic movements of each of the joints.

Although the above discussion discloses various exemplary embodiments of the invention, it should be apparent that those skilled in the art can make various modifications that will achieve some of the advantages of the invention without departing from the true scope of the invention.

What is claimed is:

1. A method for measuring a part using an articulated measurement arm having a measurement head provided with a pointing member and at least one joint fitted with at least one rotary encoder, comprising:

focusing on a first measurement point on the part, the measurement arm adopting a first measurement position;

moving the measurement arm to a second measurement position to focus on a second measurement point of the part in order to capture a geometric feature of the part on the basis of the measurement points;

determining a degree of precision of the capture of the geometric feature undertaken as a function of the first and second positions of the measurement arm; and after a measurement has been taken between two points of which the theoretical relative positions are known, providing movement instructions to the operator to enable determination of a path of the articulated measurement arm between the first measurement point and the second measurement point that provides a maximum degree of precision of the capture of the coordinates of the measurement points.

2. The method as defined by claim 1, in which the degree of precision of the capture is determined by taking into account at least one of the following features:

amplitude of the rotation of the encoders;

bending of the arm segments;

play in the axes of the joints.

3. The method as defined by claim 1, further comprising sending an indicator relating to the degree of precision determined to an operator in charge of moving the articulated measurement arm.

4. The method as defined by claim 3, in which the indicator relating to the degree of precision of the measurement includes one of the following signals: coloured lamp, numerical value, vibration, audible signal.

5. The method as defined by claim 1, further comprising determining the second measurement position of the articulated measurement arm resulting in a degree of precision of the capture that is greater than a predetermined threshold.

6. The method as defined by claim 1, wherein the measurement head and the at least one rotary encoder are linked to a processing unit, characterized in that the processing unit is set up to determine a degree of precision of the capture of a geometric feature as a function of the first and second measurement points of the arm.

7. A measuring device comprising:
an articulated measurement arm having a measurement head with a pointing member and at least one joint fitted with at least one rotary encoder,
the measurement device configured to:
focus on a first measurement point on the part and adopt a first measurement position,
move to a second measurement position to focus on a second measurement point of the part in order to capture a geometric feature of the part on the basis of the measurement points;
determine a degree of precision of the capture of the geometric feature undertaken as a function of the first and second positions of the measurement arm, and
after a measurement has been taken between two points of which the theoretical relative positions are known, provide movement instructions to an operator to enable determination of a path of the articulated measurement arm between the first measurement point and the second measurement point that provides a maximum degree of precision of the capture of the coordinates of the measurement points.

8. The device as defined by claim 7, wherein the degree of precision of the capture is determined by taking into account at least one of the following features:
amplitude of the rotation of the encoders;
bending of the arm segments;
play in the axes of the joints.

9. The device as defined by claim 7, wherein the measurement device is configured to send an indicator relating to the degree of precision determined to an operator in charge of moving the articulated measurement arm.

10. The device as defined by claim 9, wherein the indicator relating to the degree of precision of the measurement includes one of the following signals: coloured lamp, numerical value, vibration, audible signal.

11. The device as defined by claim 7, wherein the measurement device is configured to determine the second measurement position of the articulated measurement arm resulting in a degree of precision of the capture that is greater than a predetermined threshold.

12. The device according claim 7, wherein the measurement head and the at least one rotary encoder are linked to a processing unit, characterized in that the processing unit is set up to determine a degree of precision of the capture of a geometric feature as a function of the first and second measurement points of the arm.

* * * * *